United States Patent
Jin

(10) Patent No.: US 8,364,297 B2
(45) Date of Patent: Jan. 29, 2013

(54) AUDIO PLAYING METHOD

(75) Inventor: Zhao Jin, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 877 days.

(21) Appl. No.: 12/492,381

(22) Filed: Jun. 26, 2009

(65) Prior Publication Data

US 2010/0030351 A1 Feb. 4, 2010

(30) Foreign Application Priority Data

Jul. 31, 2008 (CN) .......................... 2008 1 0303270

(51) Int. Cl.
*G06F 17/00* (2006.01)
*G06F 3/16* (2006.01)
*H04M 11/00* (2006.01)
*H04B 5/00* (2006.01)

(52) U.S. Cl. ........ 700/94; 379/101.01; 381/79; 715/727

(58) Field of Classification Search .................... 379/68, 379/76, 88.13, 101.01; 381/79; 700/94; 715/727
See application file for complete search history.

(56) References Cited

U.S. PATENT DOCUMENTS

2003/0210616 A1* 11/2003 Um et al. .................. 369/30.09
2004/0186733 A1* 9/2004 Loomis et al. ............... 704/278

FOREIGN PATENT DOCUMENTS

CN 1156103 6/2004

* cited by examiner

*Primary Examiner* — Jesse Elbin

(74) *Attorney, Agent, or Firm* — Altis Law Group, Inc.

(57) ABSTRACT

The disclosure relates to an audio playing method adapted for an electronic device. The audio playing method includes (a) providing the electronic device, the electronic device comprising a processor, an audio playing program executed by the processor, and a storage system comprising a playlist comprising a plurality of audio files; (b) invoking and running the audio playing program; (c) accessing the playlist and selecting an audio file; (d) determining if the audio file selected has been previously selected as a prompt signal of the electronic device; (e) accessing another audio file in the playlist if the audio file has been previously selected as a prompt signal; and (f) playing the audio file if the audio file has not been previously selected as a prompt signal.

8 Claims, 1 Drawing Sheet

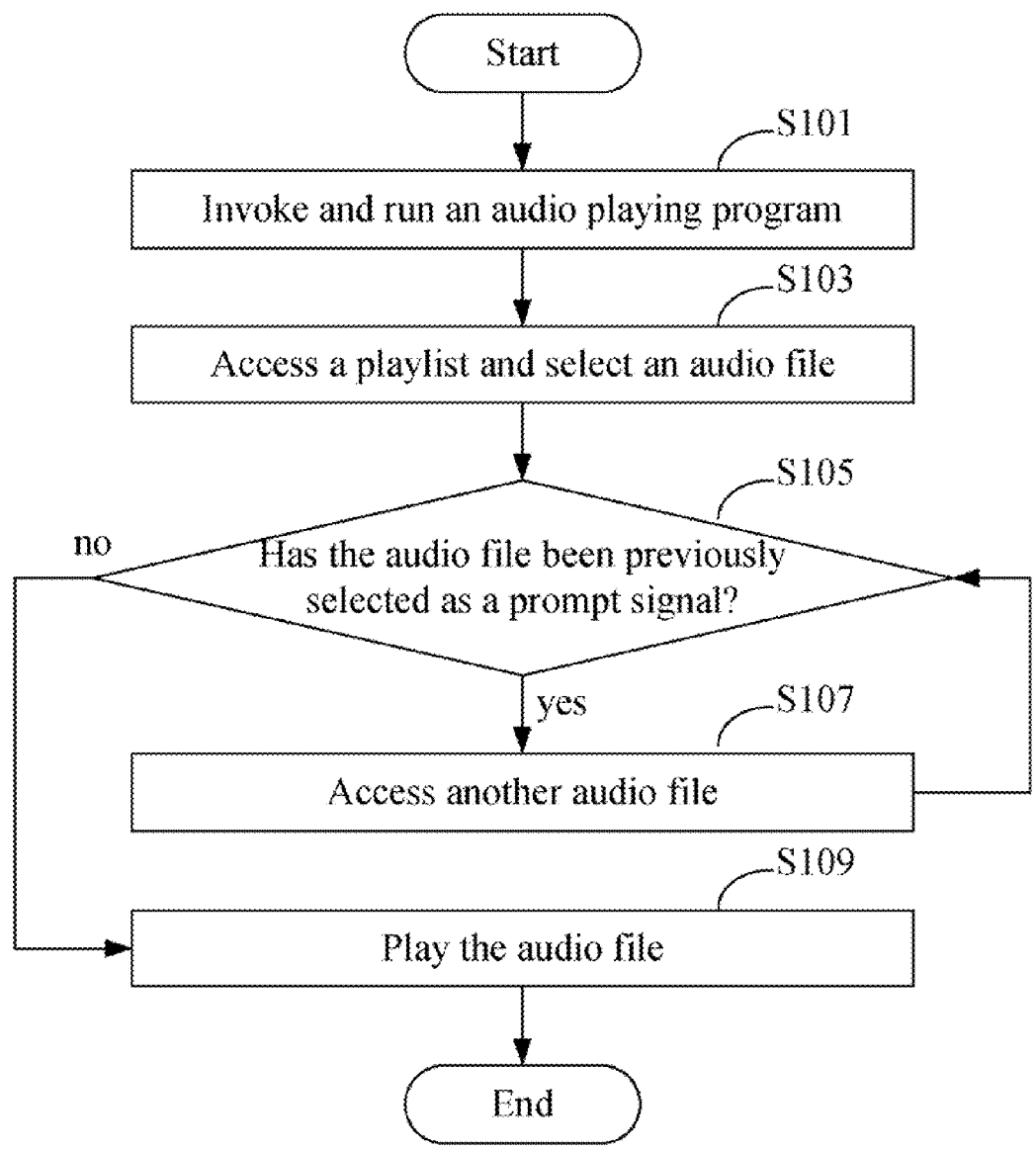

AUDIO PLAYING METHOD

BACKGROUND

1. Technical Field

The disclosure relates to a multimedia playing method adapted for an electronic device and, more particularly, to an audio playing method adapted for an electronic device.

2. Description of the Related Art

Some mobile phones are not only used for making calls, but are also used as MP3 players. Mobile phones having an MP3 playing function generally store a plurality of audio files. The audio files are also available for use, such as a ringtone, or alarm music. However, if an MP3 audio file is used as the ringtone, a user may have difficulty distinguishing between an incoming call and the MP3 playing function.

BRIEF DESCRIPTION OF THE DRAWINGS

The components in the drawing are not necessarily drawn to scale, the emphasis instead being placed upon clearly illustrating the principles of the embodiments.

A flowchart illustrating an audio playing method is provided.

DETAILED DESCRIPTION

A flowchart illustrating an audio playing method is adapted for an electronic device, such as a mobile phone, or a computer. In one embodiment, the electronic device is a mobile phone. The mobile phone includes a processor, a storage system, and one or more programs including an audio playing program such as an MP3 module. The MP3 module is executed by the processor. The storage system includes a playlist. The playlist stores a plurality of audio files. Each audio file can be played by, for example, the MP3 module for a user's enjoyment, or selected for use as a prompt signal such as a ringtone or an alarm signal. The prompt signal is for prompting a happening of an event, such as an incoming call, an alarm, or an e-mail message. Each audio file includes metadata. If an audio file is selected for use for any event other than by the MP3 module, then specific information of the selection is added to the metadata by the mobile phone.

In step S101, the mobile phone invokes and runs an audio playing program in response to user input. In step S103, the mobile phone accesses the playlist in the storage system and selects an audio file, such as selecting the audio file in front of the playlist, or selecting the audio file played at a previous time. In step S105, the mobile phone determines if the audio file selected has been previously selected as a prompt signal of the mobile phone, that is, the mobile phone accesses the metadata of the audio file and determines whether the metadata includes specific information of the audio file having been selected as a prompt signal. If the audio file has been previously selected as a prompt signal, in step S107, the mobile phone accesses another audio file in the playlist, and the procedure returns to step S105. If the audio file has not been previously selected as a prompt signal, in step S109, the mobile phone plays the audio file.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An audio playing method for an electronic device, the method comprising:
   providing the electronic device, the electronic device comprising a processor, an audio playing program executed by the processor, and a storage system comprising a playlist comprising a plurality of audio files;
   invoking and running the audio playing program;
   accessing the playlist and selecting an audio file;
   determining if the audio file selected has been previously selected as a prompt signal of the electronic device;
   accessing another audio file in the playlist if the audio file has been previously selected as a prompt signal; and
   playing the audio file if the audio file has not been previously selected as a prompt signal.

2. The audio playing method as recited in claim 1, wherein determining if the audio file has been previously selected as a prompt signal comprises accessing metadata of the audio file and determining whether the metadata includes specific information of the audio file having been selected as a prompt signal of the electronic device.

3. The audio playing method as recited in claim 1, wherein the electronic device is a mobile phone.

4. The audio playing method as recited in claim 1, wherein the electronic device is a computer.

5. The audio playing method as recited in claim 1, wherein the prompt signal of the electronic device prompts a happening of an event.

6. The audio playing method as recited in claim 5, wherein the event is an incoming call, an alarm, or an e-mail message.

7. The audio playing method as recited in claim 1, wherein accessing the playlist and selecting an audio file comprises accessing the playlist and selecting an audio file in front of the playlist.

8. The audio playing method as recited in claim 1, wherein accessing the playlist and selecting an audio file comprises accessing the playlist and selecting the audio file played at a previous time.

* * * * *